(No Model.)
B. J. COBB.
CAR BRAKE.
No. 596,361. Patented Dec. 28, 1897.
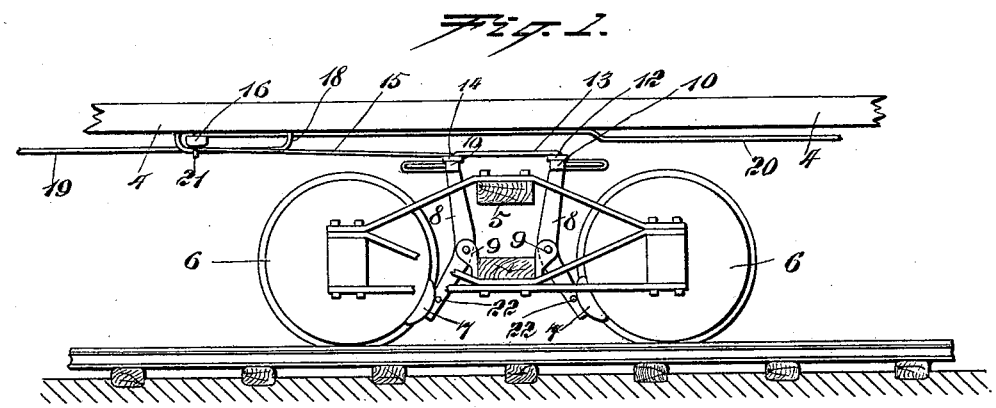
WITNESSES:
Henry T. Hirsch.
Isaac B. Orwig
INVENTOR
B. J. Cobb
BY Munn & Co
ATTORNEYS.

UNITED STATES PATENT OFFICE.

BENJAMIN JAY COBB, OF SHREVEPORT, LOUISIANA.

CAR-BRAKE.

SPECIFICATION forming part of Letters Patent No. 596,361, dated December 28, 1897.

Application filed January 8, 1897. Serial No. 618,423. (No model.)

*To all whom it may concern:*

Be it known that I, BENJAMIN JAY COBB, of Shreveport, in the parish of Caddo and State of Louisiana, have invented a new and Improved Car-Brake, of which the following is a full, clear, and exact description.

The object of the invention is to provide a car-brake in which the brake-beams and complementary parts are raised above or level with the axles of the wheels, to the end that persons lying upon the track may not be struck by the car passing over them.

The invention consists in such peculiar features of construction and combination of parts as are hereinafter described, and defined in the claims.

Reference is to be had to the accompanying drawings, forming a part of this specification, in which similar characters of reference indicate corresponding parts in all the figures.

Figure 1 is a side elevation of my invention. Fig. 2 is a plan view thereof, and Fig. 3 is a fragmentary plan view of a modification.

The form of my invention shown in Figs. 1 and 2 is applicable to a car having sills 4, a truck 5, and wheels 6. Brake-shoes 7 are carried by levers 8, fulcrumed in brackets 9, secured to the lower beam of the truck. The levers 8 are bent at the fulcrums, so that the fulcrums will be out of the center of gravity when the brakes are applied. The weight of the shoes 7 therefore, when the levers are not positively actuated, will cause the shoes to swing away from the wheels. The lower end of each lever 8 is provided with a rod 22, each rod 22 being bent inward and thence outward, so as to extend around the periphery of the adjacent wheel 6 and thence along the inner side thereof. The purpose of the rods 22 is to guide the lower ends of the levers 8, and consequently the brake-shoes 7, in their movement toward and from the respective wheels.

The levers 8 extend vertically above the truck 5. The two levers for each pair of wheels are connected to move in unison by horizontal trusses 10, running parallel with the beams of the truck 5. Connected by a link 11 with the upper beam of the truck 5 is a lever 12, pivoted at its center to one of the adjacent trusses 10. The other end of the lever 12 is connected to a link 13, extending across the beams of the truck 5 and pivoted to the center of a lever 14, the inner end of which is pivoted to the other truss 10, and the other end of the lever 14 is connected to a rod 15, extending longitudinally beneath the car and in turn connected to one end of a transverse draft-beam 16, the ends of which are slidably held in guide-loops 17 and 18, secured beneath the sills 4 of the car.

A rod 19 is attached to the beam 16 at an intermediate point and serves to apply operating movement from force other than manual, while the end of the beam 16 opposite the rod 15 has a rod 20 attached thereto, by which manual force may be applied to the beam.

The end of the beam 16 adjacent to the rod 20 is provided with two studs 21, projecting downwardly, one at each side of the guide-loop 18, which serve to hold the beam 16 steadily in place.

The beam 16 has a series of apertures therein, with any one of which the rod 19 may be connected, and by this means the power exerted by the beam 16 may be regulated to suit the conditions under which the brake is used—that is, either for light or heavy cars.

In operation when power is applied to the rod 19 the beam 16 is pulled upon, and as the ends of the beam 16 are held in the guide-loops 17 and 18 the beam swings on a pivot at the adjacent end of the rod 20. The beam 16 transmits movement to the levers 12 and 14, and the adjustment of said levers is such that the upper ends of the levers 8 will be moved toward each other and the lower ends of said levers be thrown apart from each other. This action of the levers 8 presses the brake-shoes against the periphery of the wheels, and the brakes are thus applied. Upon the relaxation of the draft on the rod 19 the weight of the levers 8 and their attached shoes 7 will release the brakes from the wheels. Manual power applied to the rod 20 will swing the beam 16 on a pivot at the adjacent end of the rod 19, so as to operate the brake in the manner just described.

The form of the invention shown in Figs. 1 and 2 is applicable only to brakes in which the brake-shoes move outward against the inner faces of the wheels. The modification shown in Fig. 3 provides means by which the levers and brake-shoes may be located at the ends of the truck and said shoes be moved inward toward each other to engage the wheels. In this arrangement the beams or trusses 23 are equivalent to the trusses 10 of the form of the invention shown in Figs. 1 and 2. Each beam or truss 23 has one end of a lever 24 pivoted thereon, one of the levers 24 being attached at its middle to a rod 25. The other lever 24 is connected at its center and through the medium of a link 26 with a support 27. The ends of the levers opposite the pivots by which the levers are connected to the beams 23 are connected to each other by a rod 28.

Draft on the rod 25 will move the immediately-adjacent beam 23 outward, which action will move the lower ends of the attached levers 8 (not shown in Fig. 3) inward and the brake-shoes will be applied to the outer faces of the car-wheels. Upon the movement of the rod 25, referred to above, the rod 28 will communicate movement to the remaining lever 24, which will throw the attached beam 23 outward, and a similar action of the corresponding brake-shoes will be caused.

Having thus described my invention, I claim as new and desire to secure by Letters Patent—

1. The combination with a car having wheels, of a lever fulcrumed adjacent to each wheel and extending vertically alongside of the same, a shoe carried by the lower end of each lever, beams connecting the levers in pairs, and means for applying power to the beams, whereby the brakes are applied, substantially as described.

2. The combination with a car having wheels, of a lever located adjacent to each wheel and extending vertically alongside of the same, a brake-shoe carried by the lower end of each lever, a beam extending across between the upper ends of the levers and connecting the levers with each other, and means in connection with the beam, by which the levers may be operated, substantially as described.

3. The combination with a car having two axles, each provided with two wheels, of a lever extending vertically adjacent to the inner side of each wheel, a brake-shoe carried by the lower end of each lever, two beams connecting the levers in pairs, two additional levers respectively connected to the beams, a link connecting said additional levers with each other, and means for applying power to one of said additional levers, substantially as described.

4. The combination of two pairs of brake-levers, extending vertically, brake-shoes carried by the lower ends of the levers, two brake-beams respectively connected to the pairs of brake-levers, a lever pivoted to each brake-beam and located at the upper end thereof, a link pivotally connecting each of the last-named levers and means for drawing on one of said last-named levers, substantially as described.

BENJAMIN JAY COBB.

Witnesses:
JOHN R. LAND,
F. A. LEONARD.